(12) United States Patent
Di Pietro et al.

(10) Patent No.: US 10,623,273 B2
(45) Date of Patent: Apr. 14, 2020

(54) DATA SOURCE MODELING TO DETECT DISRUPTIVE CHANGES IN DATA DYNAMICS

(71) Applicant: Cisco Technology, Inc., San Jose, CA (US)

(72) Inventors: Andrea Di Pietro, Lausanne (CH); Jean-Philippe Vasseur, Saint Martin D'uriage (FR); Javier Cruz Mota, Assens (CH)

(73) Assignee: Cisco Technology, Inc., San Jose, CA (US)

( * ) Notice: Subject to any disclaimer, the term of this patent is extended or adjusted under 35 U.S.C. 154(b) by 100 days.

(21) Appl. No.: 15/860,017

(22) Filed: Jan. 2, 2018

(65) Prior Publication Data
US 2019/0207822 A1 Jul. 4, 2019

(51) Int. Cl.
*H04L 12/24* (2006.01)
*G06N 3/08* (2006.01)
*G06F 8/65* (2018.01)
*H04L 12/26* (2006.01)

(52) U.S. Cl.
CPC ............... *H04L 41/20* (2013.01); *G06F 8/65* (2013.01); *G06N 3/08* (2013.01); *H04L 41/16* (2013.01); *H04L 43/14* (2013.01)

(58) Field of Classification Search
CPC ......... H04L 41/20; H04L 41/16; H04L 43/14; G06F 8/65; G06N 3/08
See application file for complete search history.

(56) References Cited

U.S. PATENT DOCUMENTS

| | | | |
|---|---|---|---|
| 9,722,906 B2* | 8/2017 | Vasseur | H04L 43/12 |
| 2016/0219070 A1 | 7/2016 | Vasseur et al. | |
| 2017/0104773 A1 | 4/2017 | Flacher et al. | |
| 2017/0104774 A1* | 4/2017 | Vasseur | G06N 20/00 |
| 2017/0230410 A1 | 8/2017 | Hassanzadeh et al. | |
| 2018/0234333 A1* | 8/2018 | Inamdar | H04L 45/123 |
| 2018/0278486 A1* | 9/2018 | Mermoud | H04L 41/16 |
| 2018/0278487 A1* | 9/2018 | Mermoud | H04L 29/06 |

* cited by examiner

*Primary Examiner* — Joe Chacko
(74) *Attorney, Agent, or Firm* — Behmke Innovation Group LLC; James Behmke; Stephen D. LeBarron

(57) ABSTRACT

In one embodiment, a network assurance service receives, from a reporting entity, data regarding a monitored network for input to a machine learning-based analyzer of the network assurance service. The service forms a reporting entity model of the reporting entity, based on at least a portion of the data received from the reporting entity. The service identifies a behavioral change of the reporting entity by comparing a sample of the data received from the reporting entity to the reporting entity model. The service correlates the behavioral change of the reporting entity to a change made to the reporting entity. The service causes performance of a mitigation action, to prevent the behavioral change from affecting operation of the machine learning-based analyzer.

20 Claims, 6 Drawing Sheets

DATA SOURCE MODELING TO DETECT DISRUPTIVE CHANGES IN DATA DYNAMICS

TECHNICAL FIELD

The present disclosure relates generally to computer networks, and, more particularly, to data source modeling to detect disruptive changes in data dynamics.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
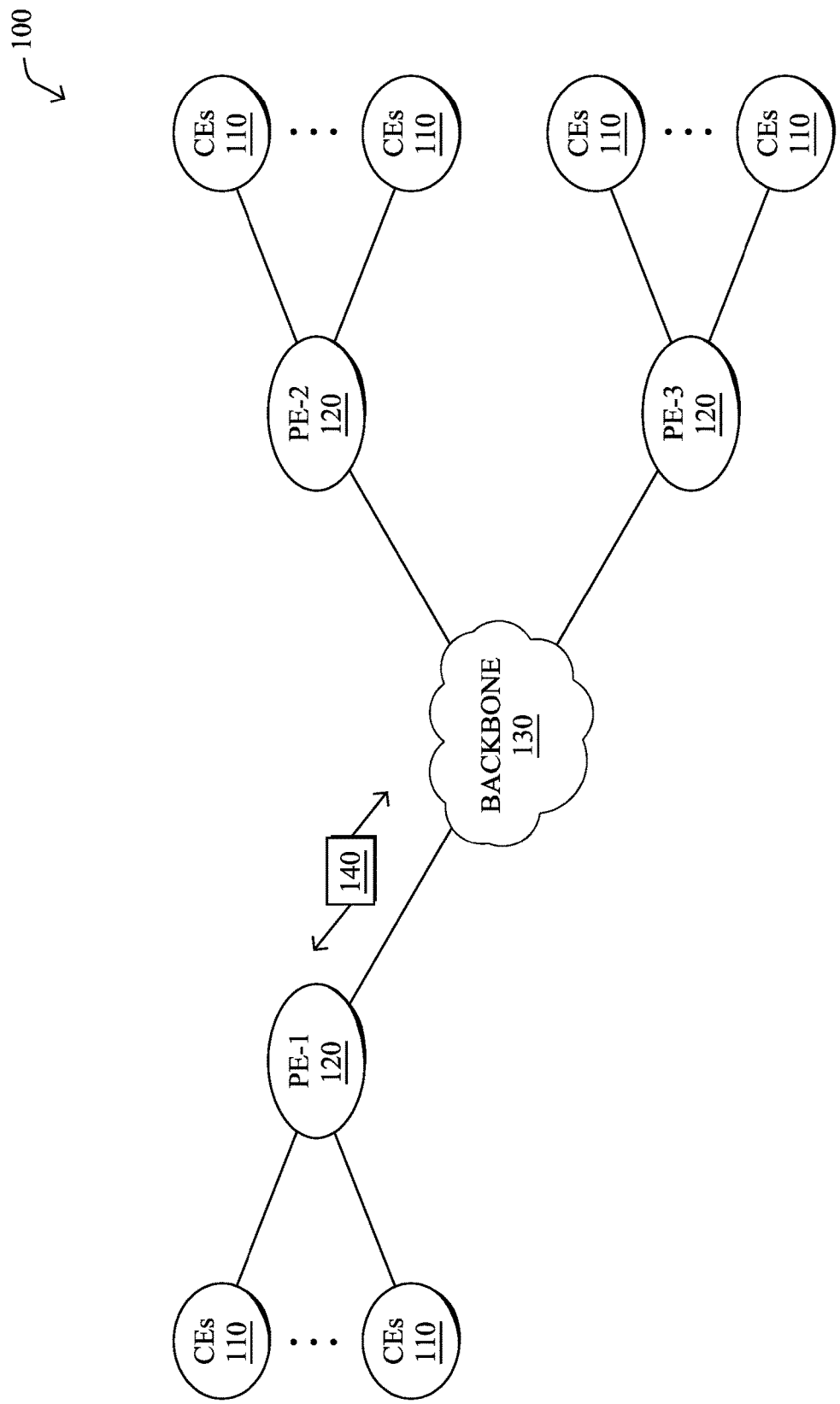
FIGS. 1A-1B illustrate an example communication network.

According to one or more embodiments of the disclosure, a network assurance service receives, from a reporting entity, data regarding a monitored network for input to a machine learning-based analyzer of the network assurance service. The service forms a reporting entity model of the reporting entity, based on at least a portion of the data received from the reporting entity. The service identifies a behavioral change of the reporting entity by comparing a sample of the data received from the reporting entity to the reporting entity model. The service correlates the behavioral change of the reporting entity to a change made to the reporting entity. The service causes performance of a mitigation action, to prevent the behavioral change from affecting operation of the machine learning-based analyzer.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
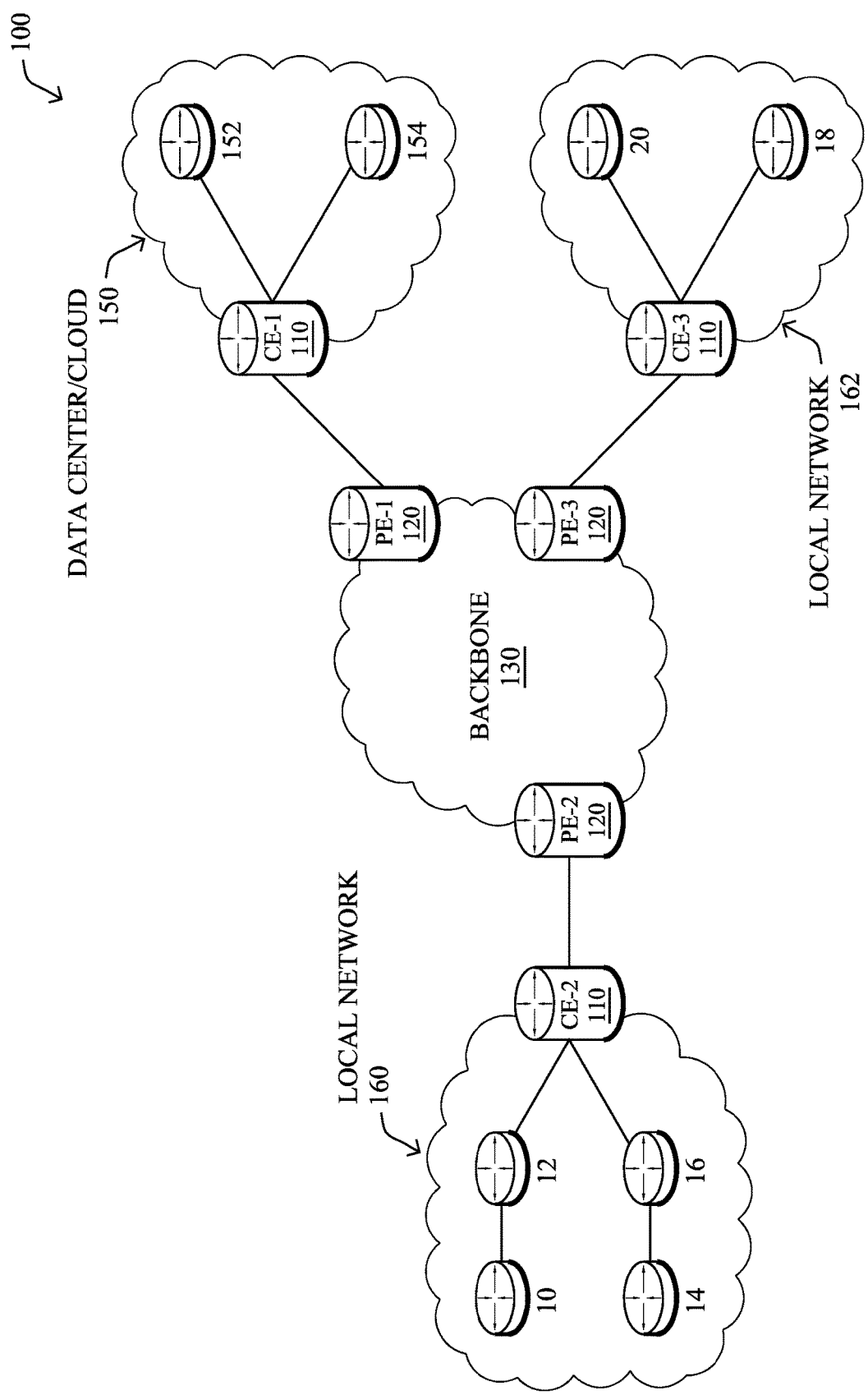

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
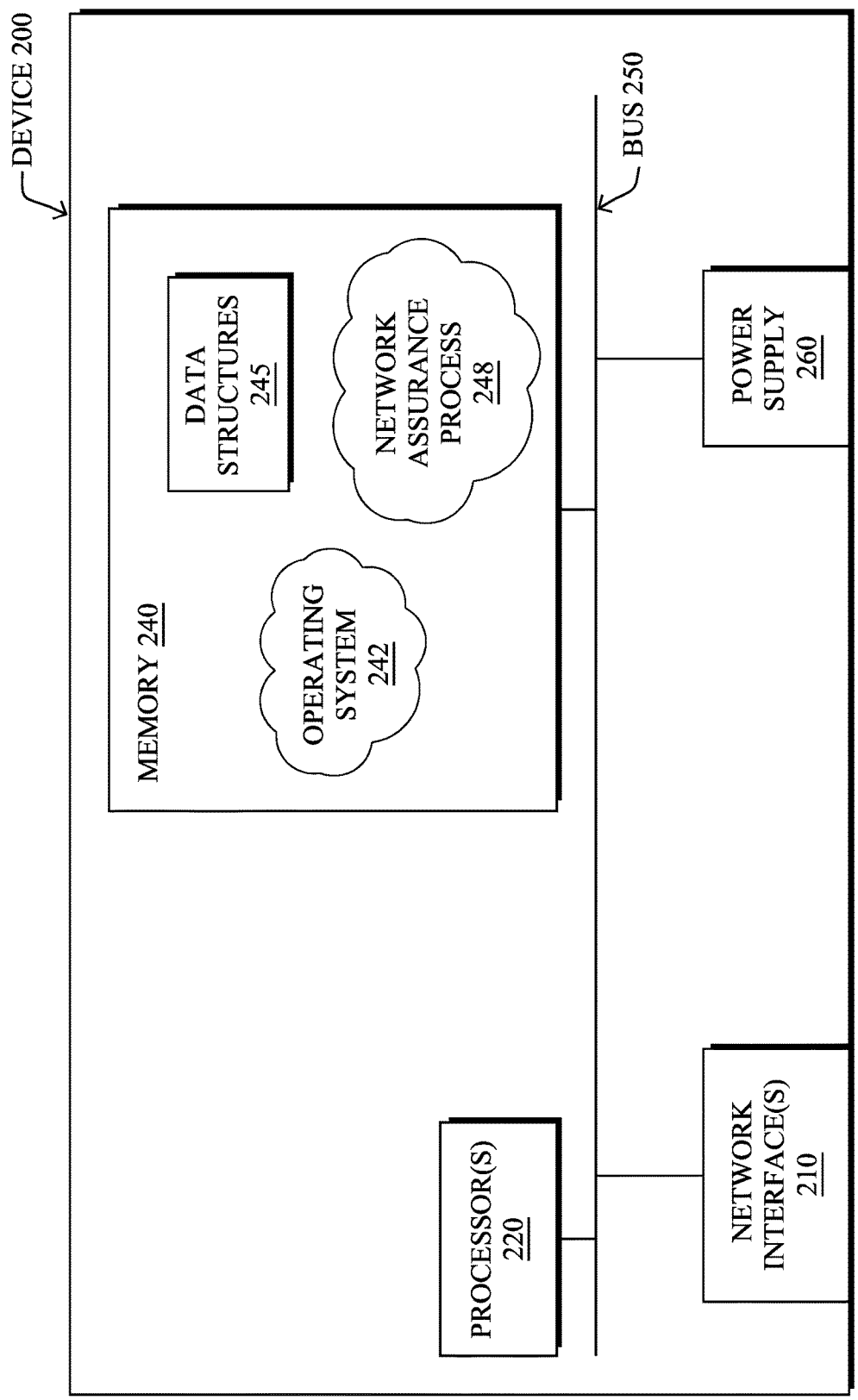
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
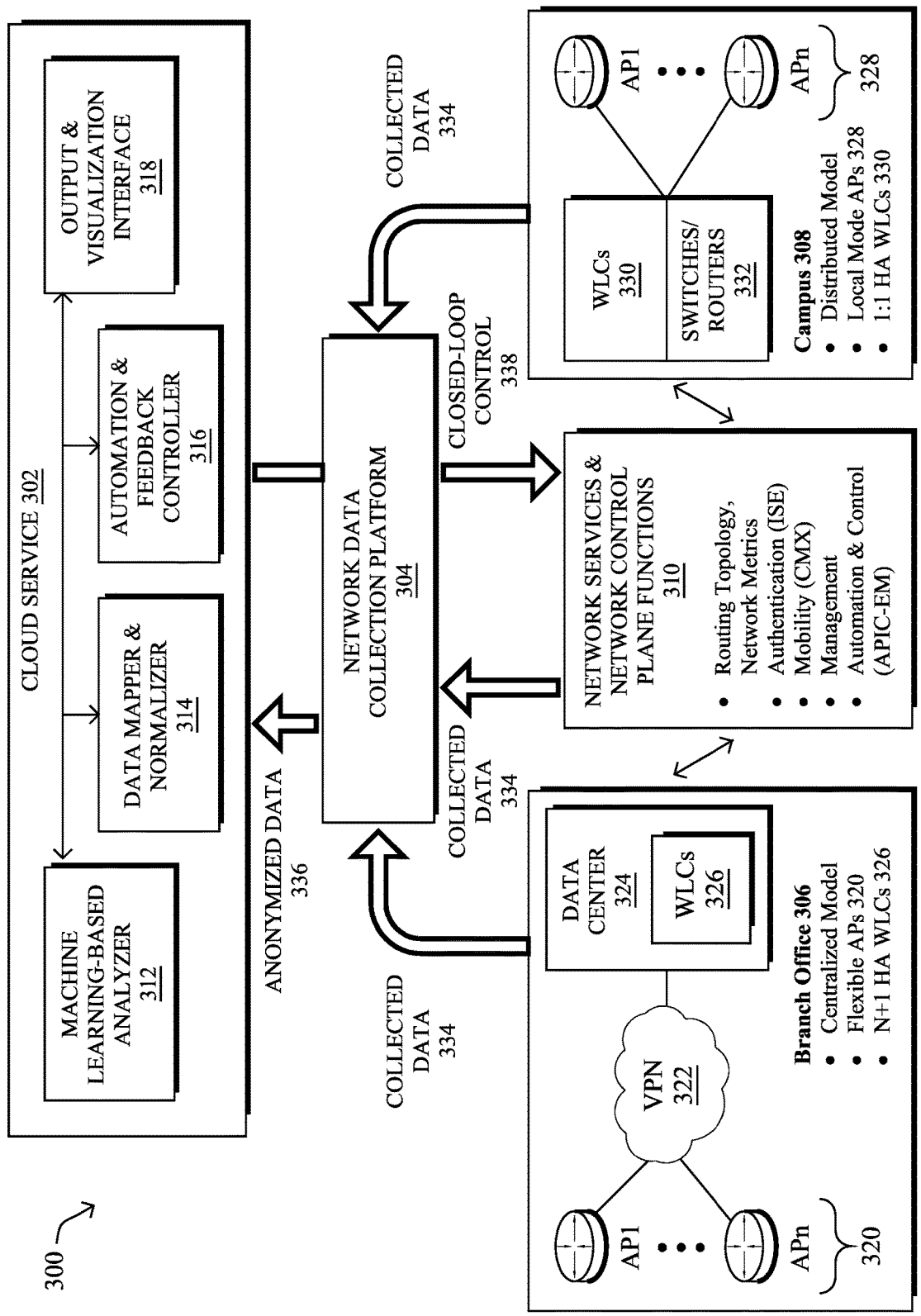
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, a machine learning engine in a network assurance system, such as machine learning-based analyzer 312 in network assurance system 300, may receive input data from a large and complex ecosystem of network devices (e.g., network controllers, routers, etc.). These data sources may execute any number of different versions of operating systems and software. All of these different versions provide monitoring data which can be gathered by using different network protocols (e.g., SNMP, Netflow, etc.).

In practice, it has been observed that device configuration changes, such as software upgrades, can sometimes change the dynamics of the exported data for some particular variables, very often without being noticed. For example, consider the cases of a software upgrade that introduces or fixes a bug or a device configuration change that adjusts the update frequency for some statistics (e.g. enabling/disabling AVC stats computation in devices supporting NBAR). In both cases, a change may result in the reported data for analysis by the machine learning engine. In another example, different software releases may change the semantics of a particular exported variable.

In some cases, boundary checks can be imposed a-priori on some of the exported data, but such checks cannot catch all of the issues. For example, assume that a bug is affecting the uptime value of a data source device. A boundary check can be used to detect whether the reported uptime is negative, but cannot detect when the value of the uptime variable has been reset to the timestamp of the last reboot, which typically occurs when switching from one version to another. Of course, monitoring the release documentation for each of the installed versions of the data sources is also hardly a scalable approach. Regardless, the consequences of changes in the data dynamics of a network monitoring system going unnoticed vary from making the system less effective and unpredictable to sometimes producing completely inaccurate results.

Data Source Modeling to Detect Disruptive Changes in Data Dynamics

The techniques herein detect changes in the data dynamics associated with data source changes within a network assurance system, such as software changes, configuration changes, and the like. In some aspects, machine learning may be used to detect changes in the dynamics of the data reported by each monitored entity of the network. This will allow for the detection of behavioral changes in the reported data which may negatively affect the performance of a machine learning-based analyzer of the network assurance system. In addition, this detection also allows an administrator of the network assurance system to take remediation actions such as data filtering or data conversion.

Specifically, according to one or more embodiments of the disclosure as described in detail below, a network assurance service receives, from a reporting entity, data regarding a monitored network for input to a machine learning-based analyzer of the network assurance service. The service forms a reporting entity model of the reporting entity, based on at least a portion of the data received from the reporting entity. The service identifies a behavioral change of the reporting entity by comparing a sample of the data received from the reporting entity to the reporting entity model. The service correlates the behavioral change of the reporting entity to a change made to the reporting entity. The service causes performance of a mitigation action, to prevent the behavioral change from affecting operation of the machine learning-based analyzer.

Illustratively, the techniques described herein may be performed by hardware, software, and/or firmware, such as in accordance with the network assurance process 248, which may include computer executable instructions executed by the processor 220 (or independent processor of interfaces 210).

Figure 4:
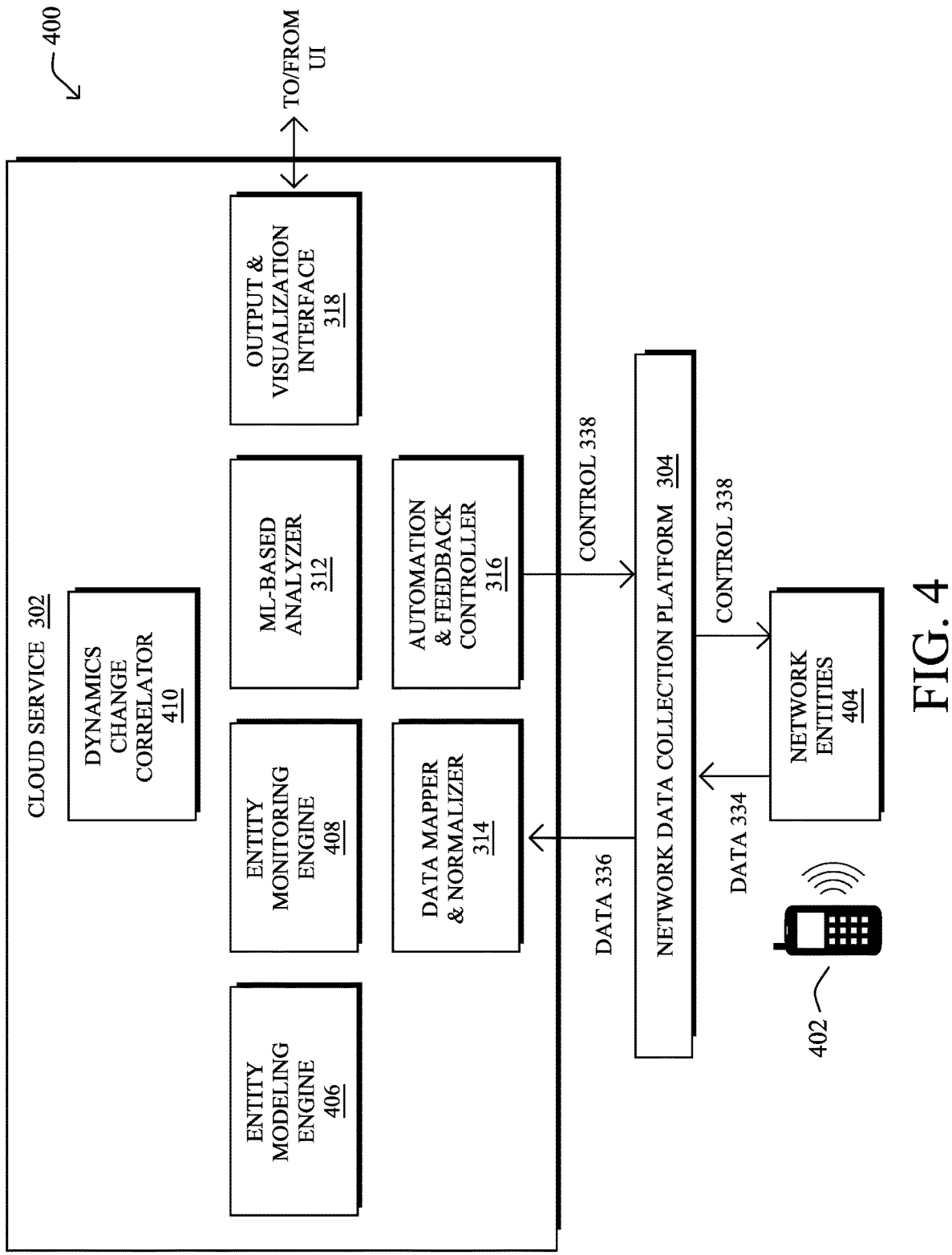
FIG. 4 illustrates an example architecture for data source modeling to detect disruptive changes in data dynamics.

Operationally, FIG. 4 illustrates an example architecture 400 for data source modeling to detect disruptive changes in data dynamics in a network assurance service, according to various embodiments. At the core of architecture 400 may be the following components: an entity modeling engine 406, an entity monitoring engine 408, and/or a dynamics change correlator 410. In some implementations, the components of architecture 400 may be implemented within a network assurance system, such as system 300 shown in FIG. 3. Accordingly, the components 406-410 of architecture 400 shown may be implemented as part of cloud service 302, as part of network data collection platform 304, and/or on one or more network elements/entities within the monitored network itself. Further, these components may be implemented in a distributed manner or implemented as its own stand-alone service, either as part of the local network under observation or as a remote service. In addition, the functionalities of the components of architecture 400 may be combined, omitted, or implemented as part of other processes, as desired.

As noted above, the techniques herein can be used to monitor the dynamics of the data reported by a particular network entity and to detect changes which would negatively affect the operation of the machine learning-based analyzer 312 that assesses data regarding the monitored network. Notably, assume that the local network being monitored includes a client device 402 and any number of network entities 404 (e.g., routers, switches, telemetry exporters, etc.) that report captured data 334 regarding the local network under observation to cloud service 302 for input to machine learning-based analyzer 312. As stated previously, this may or may not entail anonymizing the data, mapping the data, and/or normalizing the data, prior to input to the machine learning-based analyzer 312.

Assume, for purposes of illustration, that a change was made to one of the reporting network entities 404. For example, such a change may correspond to a firmware or other software update applied to the entity, a configuration change made to the entity, or the like. Such a change may inadvertently change the dynamics of the data reported by the network entity. Notably, the change to the reporting entity 404 may affect the frequency at which at least a portion of the data is reported by the entity, the semantics of the reported data, and/or the contents of the data. In turn, this may affect the operation of machine learning-based analyzer 312, thereby causing analyzer 312 to incorrectly assess the health of the local network and potentially make incorrect changes to the local network. For example, an incorrect prediction by analyzer 312 may result in analyzer 312 issuing a false alarm or controlling the local network in a non-optimal way (e.g., by assigning client 402 to a non-optimal access point, etc.).

According to various embodiments, entity modeling engine 408 may receive as input the same data stream that feeds machine learning-based analyzer 312 and processes data before handling by the machine learning-based analyzer 312. Generally, entity modeling engine 408 may monitor the dynamics of the statistics associated with each single reporting entity 404. As used herein, 'reporting entity' refers to a distinct entity in the network that actively produces monitoring data, which can be either directly reported or relayed by another entity.

Entity modeling engine 408 may aggregate data for each specific reporting entity 404 and create a reporting entity model for that entity using any number of different machine learning-based techniques. For instance, in some embodiments, simple models such as Mixtures of Gaussians or Multivariate Mixtures of Gaussians, which perform a modeling of the distribution of values, could be used. In further embodiments, more complex models that can take into account temporal and inter-variable dependencies, such as autoregressive integrated moving average (ARIMA) models, Hidden Markov models or Recurrent Neural Networks (RNNs), could be used.

A reporting entity model generated by entity modeling engine 406 that represents a given reporting entity 404 can include variables originated by different data sources/protocols. For example, the model may take into account an uptime value issued by SNMP and another one issued by Assurance. This would allow for easier detection of changes in the data dynamics that affect only one reporting protocol. In another embodiment, entity modeling engine 406 can use clustering to reveal different categories of reporting entities and build one model per cluster, thus improving the scalability of the techniques herein.

In various embodiments, architecture 400 may also include entity monitoring engine 408 which monitors the same data that machine learning-based analyzer 312 is processing and determines how well this data fits the model(s) computed by entity modeling engine 406. For instance, if the model from entity modeling engine 406 is a Recurrent Neural Network (RNN), the evaluation of the fitting by entity monitoring engine 408 can be the difference between the actual value and the values predicted by the RNN. Indeed, entity monitoring engine 408 may take each data sample received and evaluate the fitting of this sample into the model (or models) from entity modeling engine 406. If the sample is likely to belong to the model, entity monitoring engine 408 may consider the sample to be normal and the sample can even be flagged as acceptable for further model training, if needed. Conversely, if entity monitoring engine 408 determines that the sample does not fit any of the models from entity modeling engine 406, entity monitoring engine 408 may deem the sample an anomaly and can generate a behavioral change alarm.

Whenever entity monitoring engine 408 deems a sample anomalous, entity monitoring engine 408 may generate a behavior change detection message. Such a message may include any or all of the following:

- The identifier of the reporting entity 404 which triggered the dynamics change.
- If allowed by the model of entity modeling engine 406, the particular variable which generated the change.
- The category of the reporting entity 404, if clustering has been used to group reporting entities in the model.
- A description of the variable dynamics before and after the detection (e.g., a group of histograms, etc.).

In another embodiment, entity monitoring engine 408 may not automatically generate a behavior change detection message for each single anomalous sample that it detects. Instead, entity monitoring engine 408 may accumulate anomalous samples until fulfilling a criterion configured by policy. For instance, entity monitoring engine 408 may only generate a behavior change detection message when more than N-number of anomalous samples are detected in a period of M-number of minutes. In further embodiments, a behavioral change may be explicitly specified by the network administrator or other user (e.g., when equipment is changed, etc.).

In various embodiments, architecture 400 may also include a dynamics change correlator 410 that receives the behavior change detection messages issued by entity monitoring engine 408. In turn, dynamics change correlator 410 may correlate different reported data dynamic changes and attempt to attribute them to a particular change made to the corresponding reporting entity 404. For example, dynamics change correlator 410 may attempt to attribute a change in the dynamics of the reported data from an entity 404 to a software version change, configuration change, or the like, that was made to the entity 404. In further embodiments, dynamics change correlator 410 can use other techniques to detect all issues that occurred directly after a noticeable event, such as a release upgrade of a particular element 404, etc. To that end, dynamics change correlator 410 may use machine learning techniques, such as sequential rule mining.

In particular, for the reporting entity 404 associated with a behavior change detection message issued by entity monitoring engine 408, dynamics change correlator 410 may query the network controller of the monitored network, to reveal any recent changes involving such a node (e.g., software version, configuration, change in network topology etc.). In addition, dynamics change correlator 410 may also try to find a common root cause for different detections which share some common traits (e.g., software version has been upgraded on a number of different entities 404 at the same time). Once this investigation carried out, dynamics change correlator 410 may issue a message to the network administrator via output and visualization interface 318 which, in turn, communicates with a user interface (UI) to report any or all of the following:

- The kind of detected issue (e.g. behavioral/dynamics change for a particular exported variable from an entity 404).
- Inferred root cause of the dynamics change (e.g., software change, reconfiguration, etc.).
- Affected entities 404 (e.g., in case dynamics change correlator 410 managed to group together changes affecting multiple entities 404)
- Examples of data patterns showing the behavior changes (e.g., distributions before and after the detected change).

In this case, the network administrator may be asked via the UI to choose among different possible actions to mitigate the dynamics change in the reported data, including any or all of the following:

- Filtering out the data produced by the affected entities 404 from processing by machine learning-based analyzer 312.
- Suggesting a conversion strategy that would allow making the new input equivalent to the original (e.g., if the unit of the exported data has changed, the user can instruct the system to apply a scale factor). Such a conversion may be performed, for example, by data mapper and normalizer 314, in some cases.
- Reverting the configuration which caused the change (e.g., through interaction with the network controller for the monitored network).

In another embodiment, dynamics change correlator 410 can dynamically infer a conversion function which would allow data mapper and normalizer 314 to normalize the new data. In this case, dynamics change correlator 410 may first propose the inferred function to the administrator for validation. For instance, if a linear transformation $Ax+b$ is considered (e.g., for minimizing any overfitting risk), dynamics change correlator 410 can compute the parameters A and b as the least squares solution for transforming the current statistical characteristics of the data (e.g., mean, variance, skewness, kurtosis, etc.) into the statistical characteristics of the data that were observed before the behavioral change. These parameters can then be presented for review by the administrator or used automatically to transform the new incoming data from the reporting entity 404.

Finally, data mapper and normalizer 314 may be operable to implement mitigation actions with respect to the incoming data from the reporting entity 404, as selected by the administrator via the UI or automatically by dynamics change correlator 410. For example, data mapper and normalizer 314 may act as a filter, to discard data coming from a particular reporting entity 404, or as a data transformer, to apply the conversion function specified or approved by the administrator.

Figure 5:
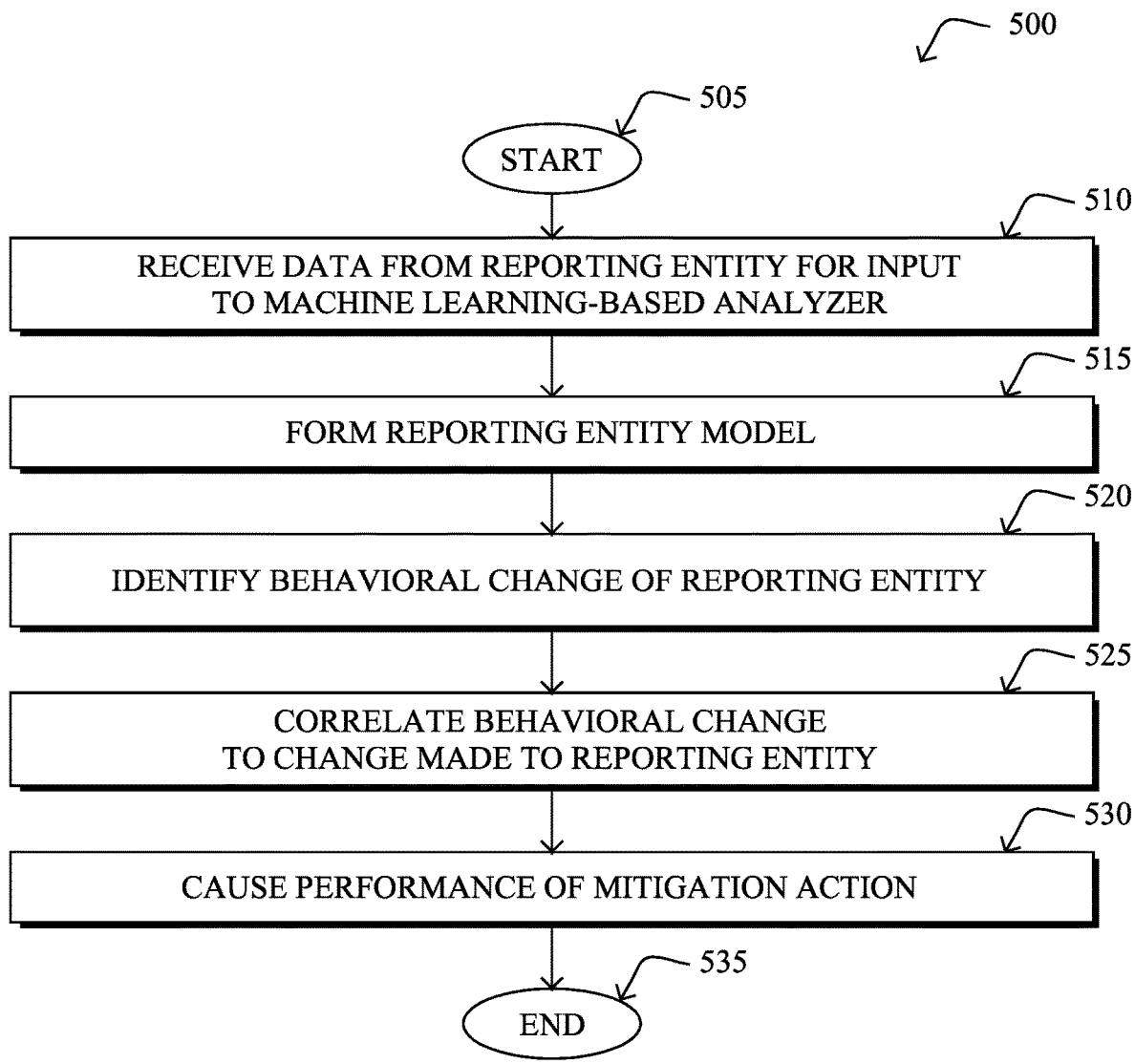
FIG. 5 illustrates an example simplified procedure for data source modeling to detect disruptive changes in data dynamics.

FIG. 5 illustrates an example simplified procedure for data source modeling to detect disruptive changes in data dynamic, in accordance with one or more embodiments described herein. For example, a non-generic, specifically configured device (e.g., device 200) may perform procedure 500 by executing stored instructions (e.g., process 248), to provide a network assurance service to a monitored network. The procedure 500 may start at step 505, and continues to step 510, where, as described in greater detail above, the network assurance service may receive, from a reporting entity, data regarding the monitored network for input to a machine learning-based analyzer of the network assurance service. Such an analyzer may, for example, be configured to perform cognitive analytics, predictive analytics, and/or trending analytics with respect to the monitored network. As would be appreciated, the reporting entity may be any form of device or service in the local network configured to capture and report telemetry data or other metrics regarding the health of the monitored network. For example, such entities may include access points, routers, switches, IPFIX or Netflow exporters, WLCs, client devices themselves, or the like.

At step 515, as detailed above, the service may form a reporting entity model of the reporting entity, based on at least a portion of the data received from the reporting entity. For example, the service may model the types of data reported by the entity, when the entity reports a given measurement, or any other behavior of the data reporting by the network entity. Example models that may be suitable for such a task may include Mixtures of Gaussians or Multivariate Mixtures of Gaussians models, as well as ARIMA models, Hidden Markov models, and RNNs.

At step 520, the service may identify a behavioral change of the reporting entity by comparing a sample of the data received from the reporting entity to the reporting entity model, as described in greater detail above. For example, assume that the reporting entity sends a new measurement reading to the service for evaluation by the machine learning-based analyzer. In such a case, the service may assess the sample in view of the reporting entity model, to determine whether the sample is anomalous, from a behavioral standpoint. This may mean, for example, that the semantics or syntax of the sample has changed from previous samples from the entity, the reporting time or frequency associated with the sample has changed from previous samples from the entity, a specific data type has been added or removed (e.g. the entity no longer reports on RSSI measurements), etc.

At step 525, as detailed above, the service may correlate the behavioral change of the reporting entity to a change made to the reporting entity. In various embodiments, the change to the reporting entity may comprise a software or firmware version change, a configuration change, or a routing change. For example, the service may query a network controller in the monitored network, to identify which changes were made to the entity and when. In turn, the service may correlate such a change to the change in the dynamics of the reported data from the entity identified in step 520.

At step 530, the service may cause the performance of a mitigation action, to prevent the behavioral change from affecting operation of the machine learning-based analyzer, as described in greater detail above. In various embodiments, the mitigation action may be performed automatically by the service or, alternatively, based on a selection of the mitigation action by an administrator. In one embodiment, the mitigation action may entail rolling back the change made to the reporting entity (e.g., downgrading the firmware of the reporting entity to its previous version, restoring the entity to its previous configuration, etc.). In another embodiment, the mitigation action may entail filtering the data from the reporting entity from analysis by the machine learning-based analyzer. In a further embodiment, the mitigation action may entail performing a data transformation on the data from the reporting entity, prior to analysis by the machine learning-based analyzer of the network assurance service. Procedure 500 then ends at step 535.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the detection and mitigation of behavioral dynamic changes in data reported to a network assurance service from a network monitored by the service. Such a change could, in some cases, negatively impact the operation of a machine learning-based analyzer of the service that analyzes the reported data.

While there have been shown and described illustrative embodiments that provide for data source modeling to detect disruptive changes in data dynamics, it is to be understood that various other adaptations and modifications may be made within the spirit and scope of the embodiments herein. For example, while certain embodiments are described herein with respect to using certain models for purposes of network assurance and modeling reported data, the models are not limited as such and may be used for other functions, in other embodiments. In addition, while certain protocols are shown, such as SNMP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

receiving, at a network assurance service and from a reporting entity, data regarding a monitored network for input to a machine learning-based analyzer of the network assurance service;

forming, by the service, a reporting entity model of the reporting entity, based on at least a portion of the data received from the reporting entity;

identifying, by the service, a behavioral change of the reporting entity by comparing a sample of the data received from the reporting entity to the reporting entity model, wherein the behavioral change is a change in dynamics of the data received from the reporting entity;

correlating, by the service, the behavioral change of the reporting entity to a change made to the reporting entity; and causing, by the service, performance of a mitigation action, to prevent the behavioral change from affecting operation of the machine learning-based analyzer.

2. The method as in claim 1, wherein the behavioral change corresponds to a change in a semantics, reporting frequency, or data type associated with the data received from the reporting entity.

3. The method as in claim 1, wherein the reporting entity model comprises at least one of: a Mixtures of Gaussians model, an autoregressive integrated moving average (ARIMA) model, a Hidden Markov model, or a Recurrent Neural Network (RNN)-based model.

4. The method as in claim 1, wherein correlating the behavioral change of the reporting entity to a change made to the reporting entity comprises:

receiving, at the service, an indication of the change made to the reporting entity from a network controller or network management entity in the monitored network.

5. The method as in claim 1, wherein the change made to the reporting entity comprises at least one of: a software or firmware version change applied to the reporting entity, a configuration change made to the reporting entity, or a routing change made to the monitored network that affects the reporting entity.

6. The method as in claim 1, further comprising:
providing, by the service and to a user interface, an indication of the behavioral change of the reporting entity and the change made to the reporting entity.

7. The method as in claim 1, wherein the mitigation action comprises: reverting the reporting entity to a previously installed version of software or firmware or reverting the reporting entity to a prior configuration.

8. The method as in claim 1, wherein the mitigation action comprises:
filtering, by the service, the data from the reporting entity from input to the machine learning-based analyzer of the network assurance service.

9. The method as in claim 1, wherein the mitigation action comprises:
performing, by the service, a data transformation to the data from the reporting entity, prior to input to the machine learning-based analyzer of the network assurance service.

10. An apparatus, comprising:
one or more network interfaces to communicate with a network;
a processor coupled to the network interfaces and configured to execute one or more processes; and
a memory configured to store a process executable by the processor, the process when executed configured to:
receive, from a reporting entity, data regarding a monitored network for input to a machine learning-based analyzer of a network assurance service;
form a reporting entity model of the reporting entity, based on at least a portion of the data received from the reporting entity;
identify a behavioral change of the reporting entity by comparing a sample of the data received from the reporting entity to the reporting entity model, wherein the behavioral change is a change in dynamics of the data received from the reporting entity;
correlate the behavioral change of the reporting entity to a change made to the reporting entity; and
cause performance of a mitigation action, to prevent the behavioral change from affecting operation of the machine learning-based analyzer.

11. The apparatus as in claim 10, wherein the behavioral change corresponds to a change in semantics, reporting frequency, or data type associated with the data received from the reporting entity.

12. The apparatus as in claim 10, wherein the reporting entity model comprises at least one of: a Mixtures of Gaussians model, an autoregressive integrated moving average (ARIMA) model, a Hidden Markov model, or a Recurrent Neural Network (RNN)-based model.

13. The apparatus as in claim 10, wherein the apparatus correlates the behavioral change of the reporting entity to a change made to the reporting entity by:
receiving an indication of the change made to the reporting entity from a network controller in the monitored network.

14. The apparatus as in claim 10, wherein the change made to the reporting entity comprises at least one of: a software or firmware version change applied to the reporting entity, a configuration change made to the reporting entity, or a routing change made to the monitored network that affects the reporting entity.

15. The apparatus as in claim 10, wherein the process when executed is further configured to:
provide, to a user interface, an indication of the behavioral change of the reporting entity and the change made to the reporting entity.

16. The apparatus as in claim 10, wherein the mitigation action comprises: reverting the reporting entity to a previously installed version of software or firmware or reverting the reporting entity to a prior configuration.

17. The apparatus as in claim 10, wherein the mitigation action comprises: filtering, by the service, the data from the reporting entity from input to the machine learning-based analyzer of the network assurance service.

18. The apparatus as in claim 10, wherein the mitigation action comprises:
performing, by the service, a data transformation to the data from the reporting entity, prior to input to the machine learning-based analyzer of the network assurance service.

19. A tangible, non-transitory, computer-readable medium storing program instructions that cause a network assurance service to execute a process comprising:
receiving, at the network assurance service and from a reporting entity, data regarding a monitored network for input to a machine learning-based analyzer of the network assurance service;
forming, by the service, a reporting entity model of the reporting entity, based on at least a portion of the data received from the reporting entity;
identifying, by the service, a behavioral change of the reporting entity by comparing a sample of the data received from the reporting entity to the reporting entity model, wherein the behavioral change is a change in dynamics of the data received from the reporting entity;
correlating, by the service, the behavioral change of the reporting entity to a change made to the reporting entity; and
causing, by the service, performance of a mitigation action, to prevent the behavioral change from affecting operation of the machine learning-based analyzer.

20. The computer-readable medium as in claim 19, wherein the behavioral change of the reporting entity is specified via a user interface.

* * * * *